No. 739,513. PATENTED SEPT. 22, 1903.
W. STEINBRECHER.
DOUGH KNEADING AND FORMING MACHINE.
APPLICATION FILED NOV. 11, 1902.
NO MODEL. 2 SHEETS—SHEET 1.

Witnesses:

Inventor
Willi Steinbrecher
by Herbert W. Jenner
Attorney

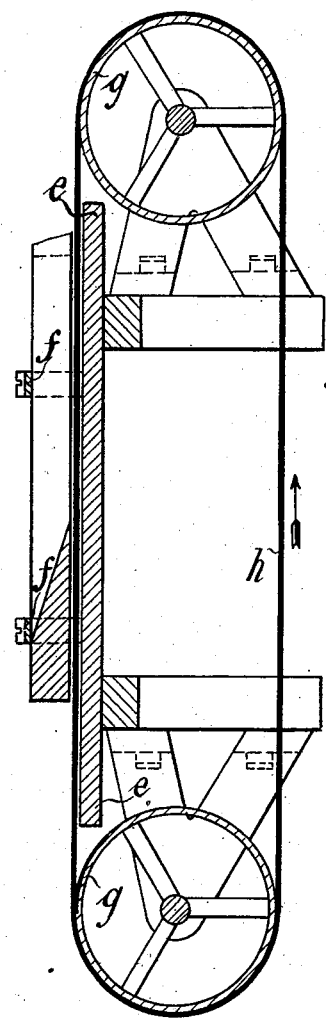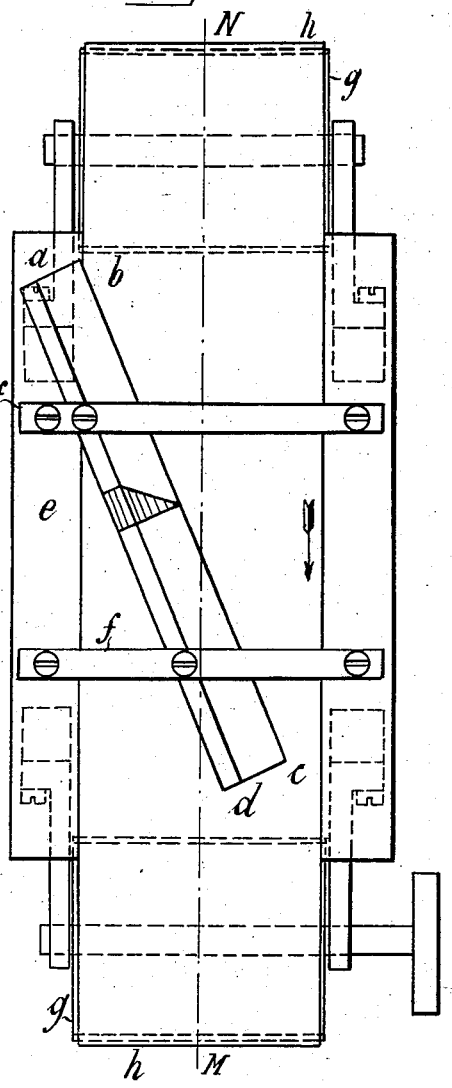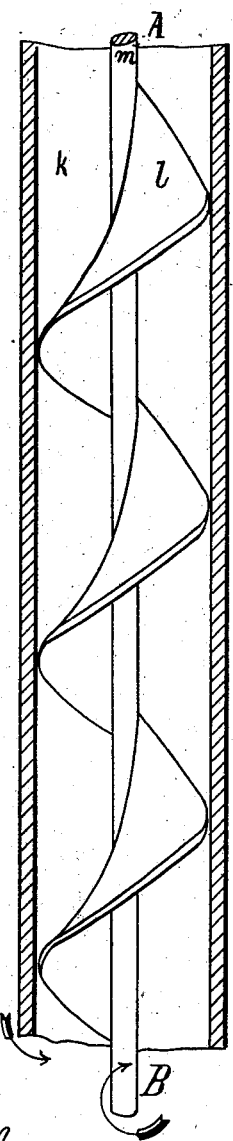

No. 739,513. Patented September 22, 1903.

UNITED STATES PATENT OFFICE.

WILLI STEINBRECHER, OF BERLIN, GERMANY.

DOUGH KNEADING AND FORMING MACHINE.

SPECIFICATION forming part of Letters Patent No. 739,513, dated September 22, 1903.

Application filed November 11, 1902. Serial No. 130,925. (No model.)

*To all whom it may concern:*

Be it known that I, WILLI STEINBRECHER, a subject of the King of Prussia, German Emperor, residing at 3 Mariannenplatz, Berlin, Germany, have invented certain new and useful Improvements in Dough Kneading and Forming Machines, (molding-machines,) of which the following is a specification.

This invention relates to a machine by which the kneading of dough on the board and the forming of the said dough into loaves, (the molding of dough,) hitherto performed by hand, are simultaneously performed by machinery.

In the various forms of this machine, all serving the same purpose, the same mechanical principle is always applied.

To render the action of the machine more easily comprehensible, I will first explain the principle in question.

The object is to render possible the kneading and simultaneous forming of a lump of dough to a ball (the molding) by producing a surface tension and at the same time rotating the said lump about its axis exactly in the same manner as the baker does it by hand.

Figure 1:
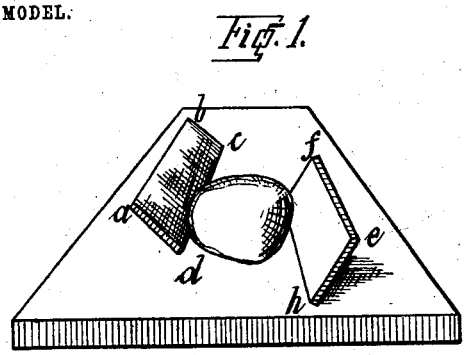
Figure 4:
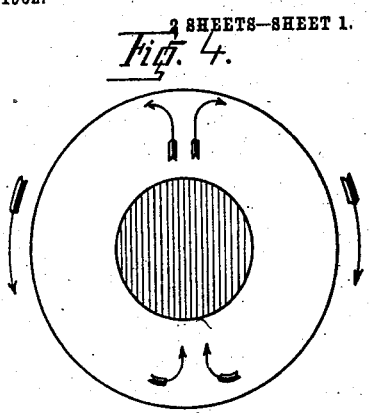
Figure 2:
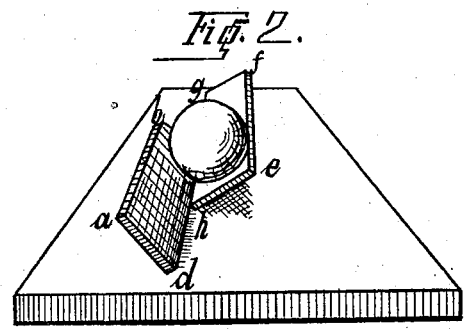
Figure 5:
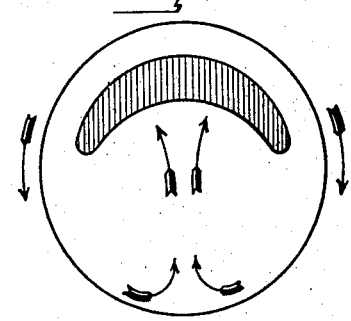
Figure 3:
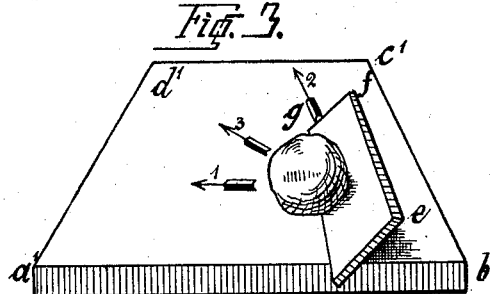
Figure 6:
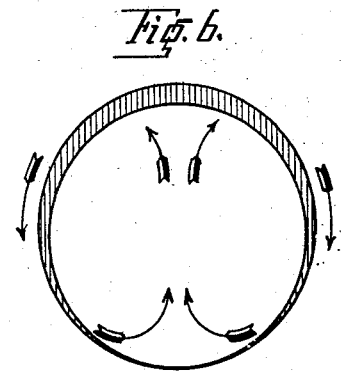
Figure 7:
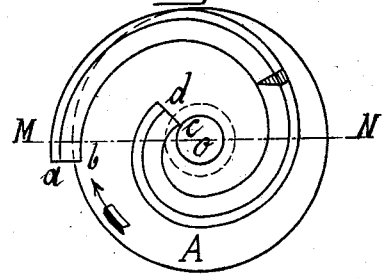

In the annexed drawings, Figures 1, 2, and 3 are perspective views illustrating the principle of the invention. Figs. 4, 5, and 6 are sectional diagrams illustrating the action of the particular mechanical movement on the dough. Fig. 7 is a plan of a form of machine, and Fig. 8 a section thereof on line M N. Figs. 9 and 10 are respectively vertical section and plan view of a modified form of machine, and Fig. 11 is a vertical section of a further modified form.

If a lump of dough is placed on a support and two boards, the position of which is shown in Fig. 1, are moved parallel to themselves and perpendicular to their lower edges toward the dough and toward each other, the dough adheres to those parts of the boards with which it is in contact, and when the boards are moved farther toward each other they exert a pull on the under surface of the outer surface of the lump at the places in contact and draw the outer surface toward the lower pole, and consequently tension it above where the dough is not in contact with the boards. The circumference of this lump is therefore reduced in the direction of the pull exerted on its surface, and the inner part of the lump swells out at the upper pole. If, however, the boards are moved in their own planes in opposite directions and tangentially to the lump, the latter remains stationary and is rotated about its vertical axis. If these two movements of the boards are combined and the said boards are moved toward each other in opposite and converging directions, each parallel to itself, until their lower edges meet, the combined movement produces both surface tension and rotation about the vertical axis. Fresh parts of the surface are continuously subjected to surface tension, and the surface parts drawn by said tension toward the lower pole are twisted or rolled to or into the lump by the rotation. By this means the dough is rendered more firm, and since those parts of the surface which project to the greatest extent beyond the spherical surface are most strongly subjected to the surface tension spherical shape is necessarily produced.

Fig. 2 illustrates the position of the boards at the end of the combined movement. Figs. 4 to 6 illustrate the movement of the dough particles caused by the described treatment and rendering the dough more firm. In proportion as particles of dough are withdrawn from the surface of the lump toward the lower pole and pressed in the latter other particles of dough from the center of the lump protrude above the upper pole on the surface. The carbon dioxid contained in the dough comes to the surface of the latter in the form of bubbles, which burst on coming into contact with the boards, so that the dough acquires uniform texture. The larger the bubbles are the sooner they burst. The movement of the separate particles can be shown by treating in the manner described a lump of dough with a colored core and white outer layer, such as shown in section in Fig. 4, in which the colored core is cross-hatched. In a short time said core will appear at the periphery and the white outer layer will become the core, so that the section will be as shown in Fig. 6. Fig. 5 is a section illustrating an intermediate stage. The arrows indicate the directions in which the dough travels.

The experiment described with the combined movement can be considerably simplified, which is of great importance for performing it by machinery. The kneading (molding) board itself can be made to fulfil the function of one of the two boards mentioned which are moved toward each other, Fig. 3.

The edge $g\,h$ of the board $e\,f\,g\,h$ is in contact with a board $a'\,b'\,c'\,d'$, and the two boards contain an obtuse angle within which and in contact with both boards is a lump of dough. (See Fig. 3.) If the board $e\,f\,g\,h$ is moved parallel to itself on the other toward the dough, (in the direction of the arrow 1, Fig. 3,) the dough will adhere to both boards at the points of contact, and tension will thus be produced on the outer surface of the dough toward the line of contact between the dough and the boards where the latter meet, and the free surface of the dough opposite the said line of contact will be stretched. This reduces the circumference of the lump in the direction of the pull exerted on its surface. If, however, starting from the position shown in Fig. 3, the boards are so displaced that board $e\,f\,g\,h$ moves in its own plane on the board $a'\,b'\,c'\,d'$ and tangentially to the lump, (direction of the arrow 2,) said lump is rotated about the axis which bisects the angle contained by the boards. If these two movements are combined,) direction of the arrow 3,) the combined movement both renders the dough firmer and gives the latter a spherical shape. The movement of the dough particles which causes the dough to become firmer is the same when the lump is treated by means of two boards and a support. The same result is obviously obtained if the board $e\,f\,g\,h$ is allowed to remain stationary and the board $a'\,b'\,c'\,d'$ is moved in its own plane in the direction opposite to that of the arrow 3, or if the board $e\,f\,g\,h$ is moved parallel to itself in the direction of the arrow 3 and the board $a'\,b'\,c'\,d'$ is moved at the same time in its own plane in the direction opposite the said arrow 3, or, speaking generally, if the board $e\,f\,g\,h$ is allowed to remain stationary or moved parallel to itself in any radial direction between the arrows 1 and 2 or in either of the directions indicated by the said arrows 1 and 2 and the board $a'\,b'\,c'\,d'$ is allowed to remain stationary or moved in its own plane in any of the radial directions opposite to the directions of the arrows 1 and 2 and to the direction between the said arrows, except in those cases where both boards are stationary or the direction of both is parallel or perpendicular to the edge $g\,h$ or where one board is stationary and the other moves in a direction parallel or perpendicular to the edge $g\,h$. The two relatively moving surfaces can also be so arranged that the line bisecting the angle contained by them is vertical or at any desired angle to the vertical. Instead of the inclined plane surfaces of the boards one or the other or both sides can be given a surface or surfaces of other shape—for instance, an inclined concave surface, (segment of a cylinder or cone or the like,) or a surface partly in the form of an inclined plane and gradually changing to one of the curved surfaces mentioned, or an incline plane surface, or concave surface, or surface partly plane and partly concave, with a gradually-changing angle of inclination.

Having explained the principle of the construction and action, my machine for kneading and forming dough (molding dough) will be easily understood.

Figure 8:
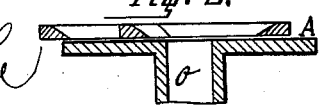

In the simplest form the machine consists of a plate rotating around a vertical axis, and over said plate is arranged a fixed spiral $a\,b\,c\,d$, as shown in Fig. 7 in plan. In this figure the operating mechanism is omitted, also the means for holding the spiral fixed. Fig. 8 is a section of Fig. 7 on the line M N. The dough is placed on the plate A, rotating in the direction of the arrow and near the periphery thereof. It is carried along the spiral-shaped plane $a\,b\,c\,d$ by the rotating plate and forced against the said spiral-shaped plane, along the edge $b\,c$ of which it passes, said edge forming an obtuse angle with the rotating plate, and finally the dough falls through a hole O in the center of the plate. The spiral can of course also be arranged in an outwardly-sloping plane. In this case a forward movement of dough from the center to the periphery takes place. A similar machine, but with slightly-different operating arrangements, is illustrated in Figs. 9 and 10. The movable surface is here arranged as an endless band and the fixed surface as a beveled and inclined rail. The dough falls on the endless band $h$, moving in the direction indicated by the arrow, said band running over a fixed plate $e$ and two rollers $g$, arranged at the ends of said plate. On movement of the endless band the lump of dough is driven at $b$ against the surface $a\,b\,c\,d$, forming an obtuse angle with the band, and is guided along its edge to the point $c$, where it is carried from the band $h$ in the direction of movement of the latter. The rail provided with the surface $a\,b\,c\,d$ is fixed to plate $e$ by means of bars $f$.

A further modification of the machine is illustrated in Fig. 11. In this case the surface $l$ is made of spiral shape and arranged around an axle $m$ in such a manner that the convolutions do not stand perpendicularly on it, while the other surface is formed by a hollow cylinder $k$, surrounding the spiral. The dough passes through the apparatus in the direction indicated by the arrows from A to B.

In all the forms of this machine hereinbefore described the dough rests upon the support and upon the molding-board and is in full view of the operator during the whole operation. The surfaces upon which the dough rests can be watched and flour can be dredged upon them at all times should the dough show any tendency to stick to them. Small particles of dough will adhere to the molding-surfaces, and these can be removed as soon as they are observed. When one of the molding-surfaces is hidden from view and when an inverted channel is used instead of a molding-board, such channel is very apt to become obstructed by the dough, which sticks to it and prevents the machine from working properly.

What I claim is—

1. In a machine for molding plastic material, the combination with a support for the material provided with a molding-surface, of a molding-board arranged over the said support and provided with a beveled molding-surface on its upper side which forms an obtuse angle with the said molding-surface of the support and which also partially supports the material, and in which angle the dough is molded, and means for moving one of the said parts diagonally of the other said part in the plane of the molding-surface of the said support, substantially as set forth.

2. In a machine for molding plastic material, the combination, with a support for the material provided with a molding-surface, and means for moving the said support in the plane of its said molding-surface, of a stationary molding-board arranged above the said support at an angle to the direction of its motion, said molding-board being provided with a beveled molding-surface on its upper side which forms an obtuse angle with the molding-surface of the said support and which also partially supports the said material, and in which angle the dough is molded, substantially as set forth.

3. In a machine for molding plastic material, the combination, with a support for the material provided with a molding-surface on its upper side, of a molding-board arranged over the said support and also provided with a molding-surface on its upper side, the two said molding-surfaces being arranged at an obtuse angle to each other in full view of the operator and both of them being under the material operated on and in which angle the dough is molded, and means for moving one of the said parts diagonally of the other said part in the plane of the molding-surface of the said support.

In witness whereof I have signed this specification in the presence of two witnesses.

WILLI STEINBRECHER.

Witnesses:
WOLDEMAR HAUPT,
HENRY HASPER.